SAFETY BELT BUCKLE
Original Filed July 3, 1962 2 Sheets-Sheet 1
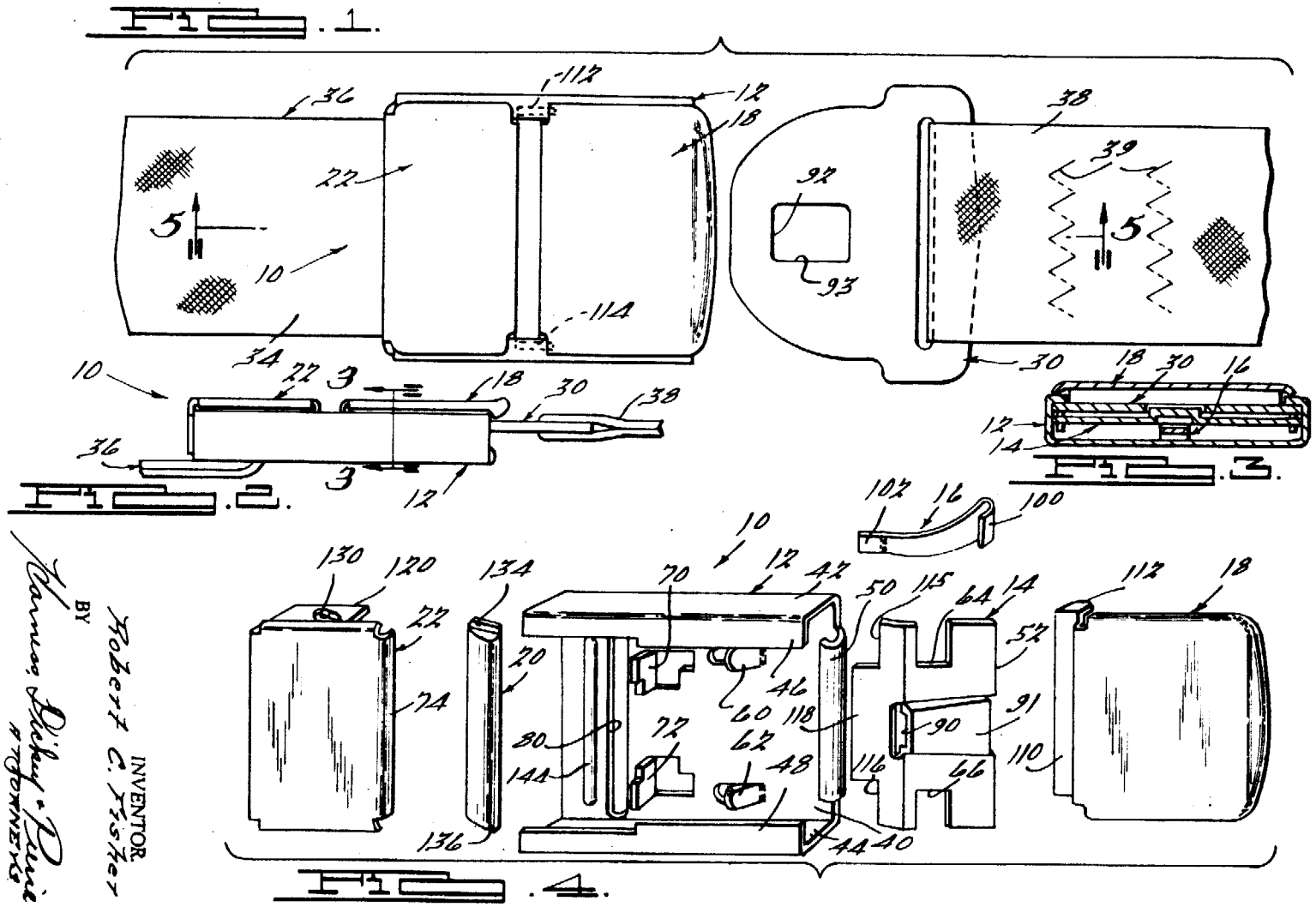
INVENTOR.
Robert C. Fisher
BY
Harness, Dickey & Pierce
ATTORNEYS SAFETY BELT BUCKLE
Original Filed July 3, 1962 2 Sheets-Sheet 2
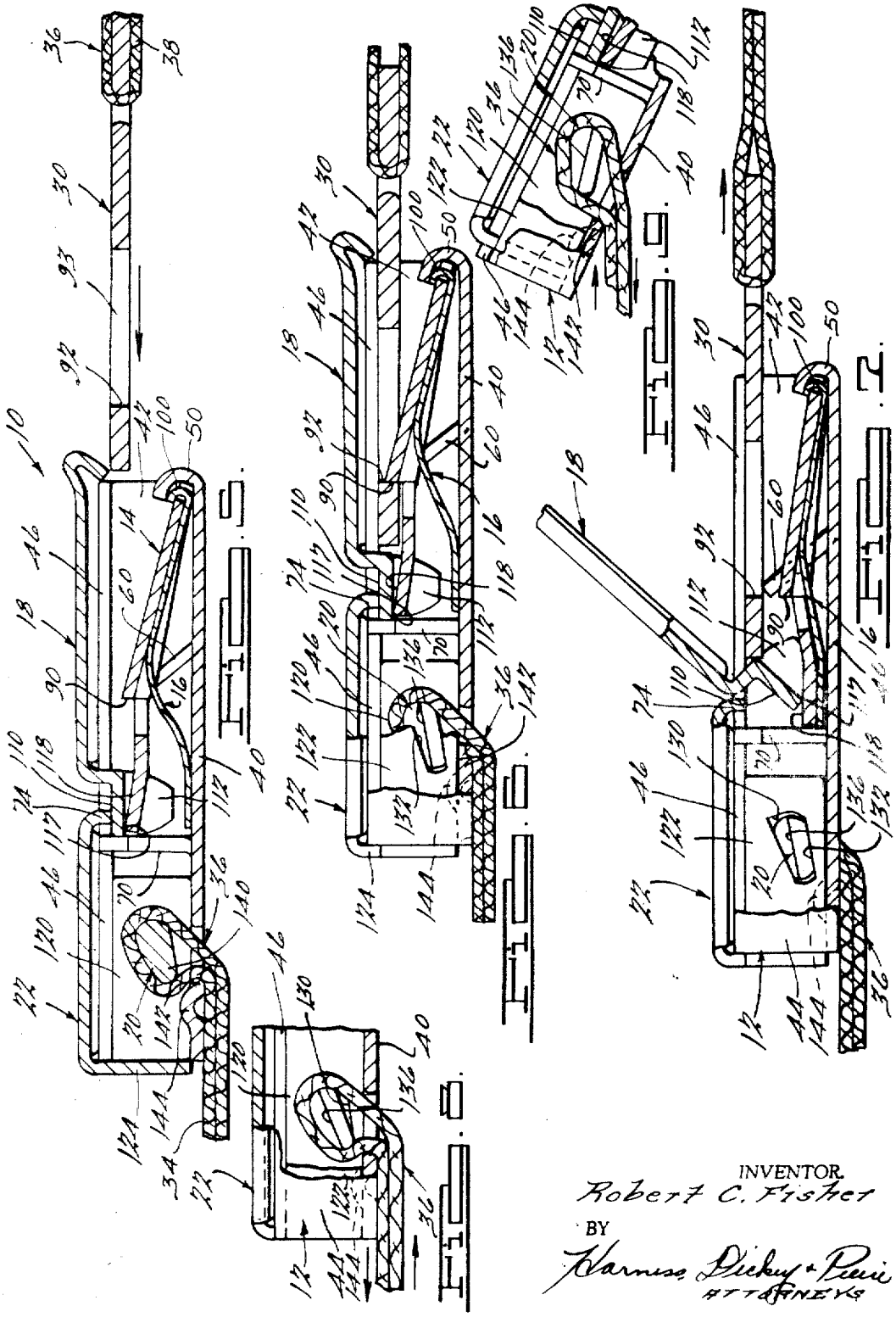
INVENTOR.
Robert C. Fisher
BY
Harness, Dickey & Pierce
ATTORNEYS United States Patent Office Re. 26,754
Reissued Jan. 6, 1970

26,754
SAFETY BELT BUCKLE

Robert C. Fisher, Bloomfield Hills, Mich., assignor to Hamill Manufacturing Co., Washington, Mich., a corporation of Michigan Original No. 3,131,451, dated May 5, 1964, Ser. No. 207,262, July 3, 1962. Application for reissue Oct. 21, 1965, Ser. No. 505,133
Int. Cl. A44b *11/25*
U.S. Cl. 24—230 19 Claims

Matter enclosed in heavy brackets [ ] appears in the original patent but forms no part of this reissue specification; matter printed in italics indicates the additions made by reissue.

*ABSTRACT OF THE DISCLOSURE*

*A buckle for automobile type safety belts having a male member insertable in a female receptacle having a base member having a web portion with upstanding flanges on opposite sides, with the flanges having inturned edge portions, the male member being trapped in the female receptacle by a releasable latch.*

This invention relates generally to buckles, and more particularly to an improved buckle for automobile type safety belts.

Recognition of the part that automobile safety belts play in decreasing passenger injuries due to automobile upset and collision has emphasized the need for an improved safety belt buckle capable of withstanding the relatively severe loads to which the buckles of such safety belts are subjected, yet of aesthetically pleasing and economical construction.

The design of automobile safety belt buckles heretofore known and used has emphasized, primarily, the ability of the belt buckle to withstand the relatively severe loads to which such safety belts are subjected. Relatively little attention has been given to the refinement of such buckles to the point where they are aesthetically pleasing, economically constructed, and free of all unsatisfactory operating characteristics.

The safety belt buckle of the instant invention presents a material step forward in the safety belt buckle art since its design considers the many environmental and aesthetic factors which are necessarily a part of a totally satisfactory belt buckle. In addition, the safety belt buckle of the instant invention sets a new standard in terms of strength. The various optimum qualities of a safety belt buckle have been ingeniously integrated into a safety belt buckle that is relatively light in weight, relatively small in physical dimension, easy to open and close, and clean and smooth in appearance.

More particularly, it is desirable for a safety belt buckle to be relatively lightweight. One way to reduce the weight of such a buckle assembly is to reduce the gauge of the metal employed in the components of the buckle. However, any reduction in gauge necessitates careful stress analysis of the components of the belt buckle. As a result of such an analysis, it has been discovered that the gauge of the metallic components of the buckle can be minimized by substantially eliminating any couples acting on the components of the buckle.

Accordingly, one object of the instant invention is a safety belt buckle wherein loads are transmitted to and through the buckle without producing any substantial couples on the components of the buckle.

Safety belt buckles heretofore known and used have often employed relatively long, heavy, and therefore cumbersome release handles. This has been a requirement in such known buckles in order to obtain sufficient mechanical advantage to effect opening of the buckle under load. Thus, another object of the instant invention is a safety belt buckle having a relatively short, light and therefore easily assembled and operated release handle.

The cost of a safety belt buckle is directly related to the number of components employed therein. Thus, in addition to its own cost, each additional component complicates and therefore adds to the cost of assembly. Therefore, another object of the instant invention is a safety belt buckle having a minimum number of components.

It is well known that stamped parts can be produced in large quantities at relatively low cost, as opposed to, for example, die casting or machined parts. Because the cost of the finished safety belt buckle is directly related to the cost of its components, it is an object of the instant invention to reduce the cost of the buckle by making the buckle entirely of stampings.

One deleterious feature of safety buckles heretofore known and used is that the latch portion of the buckle tends to be biased to an unlatched condition when the buckle is subjected to load, thus requiring springs or other devices to maintain the latch in the closed condition.

Accordingly, yet another object of the instant invention is a safety belt buckle wherein load tends to tighten the latch, thereby obviating the need for a spring or other form of latch retainer when the belt buckle is under load.

Another desirable feature that speeds and reduces the cost of assembly of a safety belt buckle is that the components thereof are self-retained, thereby eliminating fastening pins, screws or the like.

Yet another object of the instant invention is a safety belt buckle comprised of components that are self-contained, rendering assembly a relatively simple and quick procedure.

It is well known that a flanged channel has a relatively large strength to weight and size ratio. Accordingly, another object of the instant invention is to utilize a flanged channel as the load-accepting member of a safety belt buckle.

It often occurs that the occupant of a motor vehicle must release a safety belt by only one hand. This condition may obtain for example, when one hand of the occupant is pinned or otherwise disabled. Thus, it is desirable for a safety belt buckle to be openable by only one hand, or, in other words, a pull on the release handle should effect separation of the buckle and tongue.

Accordingly, another object of the instant invention is a belt buckle wherein operation of the release handle is in the proper direction to allow one-hand release.

It is desirable that the release handle of a seat belt buckle be movable in what may be termed a lever action as opposed to, for example, a scissors or camming action. Such a lever action increases the mechanical advantage of the release handle so that release force is a minimum under load. Such an action also increases the amount of movement necessary to effect unlatching, thereby minimizing the possibility of accidental unlatching, and permits the use of a short, relatively light release handle, minimizing the chance of accidental unlatching by a coat sleeve, etc.

Accordingly, yet another object of the instant invention is a safety seat belt buckle having a release handle that operates with a lever action.

It is a natural tendency for an occupant of a motor vehicle to grasp a safety belt buckle in one hand and insert the tongue of the belt thereinto with the other hand. Thus, it is desirable for the release handle of the belt buckle to remain in a closed condition upon insertion of the tongue, allowing the occupant to grasp the buckle portion with only one hand. Thus, another object of the instant invention is a safety belt buckle wherein the release handle does not open upon insertion of the tongue into the buckle, allowing the buckle to be held in one hand while being assembled.

Obviously, it is undesirable for a safety belt buckle to be falsely latched. Thus, another object is a belt buckle that precludes spurious engagement of the tongue therewith.

Yet another object is a safety belt buckle having a relatively clean and low profile.

Safety belts must withstand relatively high inertia or "G" forces attendant to a head-on collision or collision with a relatively immovable object. Thus, yet another object of this instant invention is a safety belt buckle wherein inertia or "G" forces tend to tighten the latch, as opposed to opening the latch.

Safety belt buckles are subject to jostling in a motorist's lap or to minor impacts with hands, articles carried on the automobile seat, etc. Thus, it is desirable for the belt buckle to be so designed that such actions or impacts do not effect release of the adjustment mechanism and loosening of the belt.

Accordingly, another object of the instant invention is a belt buckle wherein the adjusting mechanism cannot be spuriously released to permit loosening of the belt.

Consonant with the foregoing object, it is desirable to be able to shorten a safety belt without necessitating release of the adjusting mechanism thereof. Accordingly, yet another object of the instant invention is a safety belt buckle that permits shortening of the safety belt without requiring release of the adjusting mechanism.

Experience has shown that premature wear of the webbing of a safety belt is aggravated by the use of knurled, grooved or otherwise roughened surfaces within the belt buckle. It is an object of the instant invention to eliminate such knurled, grooved or otherwise abraded surfaces, thereby to reduce abrasion of the belt webbing.

The overall height of a safety belt buckle is dictated in part by the profile of the tension bar employed in the adjusting mechanism. Therefore, another object of the instant invention is an adjusting mechanism for a safety belt buckle having an improved tension bar of relatively low profile, thereby to minimize the overall height of the buckle.

Safety belt buckles are obviously of no utility unless the occupant of a motor vehicle uses the safety belt. When such buckles are cumbersome and have protruding components that can possibly catch and tear clothing, the safety belt will not be utilized.

Accordingly, still another object of the instant invention is a buckle for a safety belt that is relatively clean and smooth and has no parts projecting through the sides thereof so as to minimize the possibility of catching and tearing clothing.

Other objects and advantages of the instant invention will be apparent from the following specification, claims and drawings, wherein:

FIGURE 1 is a top view of the safety belt buckle of the instant invention with the tongue removed therefrom;

FIG. 2 is a side elevational view of the safety belt buckle of the instant invention with the tongue assembled;

FIG. 3 is a cross sectional view taken substantially along the line 3—3 of FIG. 2;

FIG. 4 is an exploded perspective view of the safety belt buckle of FIGURE 1;

FIG. 5 is a cross sectional view taken substantially along the line 5—5 of FIGURE 1;

FIG. 6 is a cross sectional view similar to FIG. 5 with the tongue engaged within the buckle;

FIG. 7 is a view similar to FIG. 5 with the release handle and latch plate rotated to the release condition;

FIG. 8 is a fragmentary view of the adjustment slide showing the belt bar rotated to facilitate shortening of the belt; and FIG. 9 is a fragmentary view similar to FIG. 8 showing the adjustment slide and buckle in condition to permit lengthening of the belt.

As best seen in FIG. 4 of the drawing, a safety belt buckle 10, in accordance with an exemplary embodiment of the instant invention, comprises a base 12, a latch plate 14, a latch, *leaf, or operating* spring 16, a handle 18, a belt bar 20 and a rear slide 22. The foregoing components are assembled in interlocking relationship on the base 12 and are self-retained in the assembled condition, as will be described. A tongue 30 (FIGURE 1) is adapted to be releasably accepted and retained within the buckle 10. An end portion 34 of a belt 36 is adapted to be adjustably looped around the bar 20 and an end portion 38 of the belt 36 is secured to the tongue 30 as by stitching 39.

As best seen in FIGS. 4 through 8 of the drawings, the base 12 of the buckle 10 is of channel-like lateral cross sectional configuration defined by a web portion 40 with flange portions 42 and 44 at the opposite edges thereof. The flange portions 42 and 44 of the base 12 have inwardly folded edges 46 and 48 thereon, respectively, that extend generally parallel to the web portion 40 thereof.

The web portion 40 of the base 12 has a reentrantly folded latch retainer 50 at one end thereof that pivotally accepts an edge portion 52 of the latch plate 14. The latch plate 14 is both supported for rotation relative to the base 12 and retained against movement outwardly of the base 12 by the retainer portion 50 thereof.

A pair of tongue strippers 60 and 62 are struck upwardly from the web portion 40 of the base 12 and are receivable in a pair of complementary cutouts 64 and 66 in the latch plate 14, respectively. The tongue strippers 60 and 62 serve to position the tongue 30 against the underside of the edge portions 46 and 48 to retain the tongue 30 in this position upon retraction of the latch plate 14, as will be described.

The base 12 is provided with a second pair of ears 70 and 72 that are struck upwardly from the web portion 40 thereof for the retention of the rear slide 22 and to position the handle 18 and latch plate 14. A frontal lip 74 of the rear slide 22 is engageable over the ears 70 and 72 upon assembly, as will be described.

The base portion 12 is provided with a laterally extending slot 80 for the acceptance of the end portion 34 of the belt 36, which is looped about the bar 20.

The latch plate 14 has a latch face 90 on an offset portion 91 that is struck outwardly from the surface of the latch plate 14. The latch face 90 is engageable with a complementary latch surface 92 on the periphery of an aperture 93 in the tongue 30 to effect locking of the tongue 30 within the buckle 10.

The latch plate 14 is normally biased toward the latched condition by the leaf spring 16, one end portion 100 of which is disposed about the offset portion 91 of the latch plate 14, and the other end portion 102 of which engages the web portion 40 of the base 12.

The handle 18 has an offset portion 110 that is accepted under the lip portion 74 of the slide 22, thereby to substantially close the top of the buckle 10. The offset portion 110 of the handle 18 has a pair of ears 112 and 114 that are accepted in complementary cutouts 115 and 116 on the latch plate 14, thereby to retain the handle 18 in the position shown in the drawings.

As can best be seen by comparing FIGS. 5, 6 and 7, the handle 18 pivots on the underside of the folded edge portions 46, and 48 on the base 12, so as to bring an edge portion 117 thereof into engagement with an inner end portion 118 of the latch plate 14, thereby to cam the latch plate 14 about the latch retainer 50 on the base 12 toward the open condition.

As best seen in FIGS. 5 through 9, the belt bar 20 is supported by a pair of inwardly extending ears 120 and 122 on the slide 22 that extend inwardly from a downwardly depending rear portion 124 of the rear slide 22.

As best seen in FIGS. 7, 8 and 9, the bar 20 is retained in a pair of truncated triangular apertures 130 and 132 in the ears 120 and 122, respectively. The bar 20 is of generally tear-shaped cross section with coined or flattened end portions 134 and 136 that are accepted in the apertures 130 and 132, respectively.

As best seen in FIG. 5 of the drawings, the end portion 34 of the belt 36 is looped over the bar 20 and extends downwardly through the aperture 80 in the web portion 40 of the base 12. It is to be noted that, as shown in FIG. 6, when the belt buckle 10 is under load, an edge portion 140 of the bar 20 substantially overlies a frontal edge portion 142 of the web 40 of the base 12. Also, the bar 20 is supported by the apertures 130 and 132 in spaced relation to the web portion 40 of the base 12 an amount approximately equal to the thickness of the belt 36 so that, upon the application of load to the belt 36, the bar 20 and the portion 142 of the base 12 move into mutually reinforcing relation and also effect a slight pinch of the belt 36 therebetween.

It is also to be noted that a rib 144 is displaced upwardly from the web portion 40 of the base 12 to aid the lip 74 in limiting movement of the slide 22 relative to the base 12 under load. The rib 144 also precludes slip of the belt 36 when the buckle 10 is subjected to severe loads.

The seat belt buckle 10 of the instant invention is assembled by first engaging the end portion 100 of the latch spring 16 about the offset portion 91 of the latch plate 14, as seen in FIG. 5. The assembled latch plate 14 and spring 16 are then inserted under the edge portions 46 and 48 of the base 12, and moved inwardly of the base 12 to the position shown in FIG. 8 of the drawings. The offset portion 110 and ears 112 and 114 of the release handle 18 are then inserted under the edge portions 46 and 48 of the base 12, the ears 112 and 114 sliding ovr the latch plate 14 until they are received within the cutout portions 115 and 116 thereof, respectively. When the ear portions 112 and 114 drop into the cutouts 115 and 116, respectively, the handle is retained from outward movement from the base 12.

The bar 20 is next assembled with the slide 22 by inserting the edge portion 134 thereof into the aperture 130 in the ear 120 of the slide 22, thence snapping the opposite edge portion 136 of the bar 20 into its complementary aperture 132. The end portion 34 of the belt 36 is inserted through the slot 80 in the base 12, hence about the bar 20. The assembled bar 20, slide 22 and end portion 34 of the belt 36 are then inserted into the open end of the base 12 from the left, as seen in the drawings, the ears 120 and 122 being accepted between the edge portions 46 and 48 and the web portion 40 of the base 12. The assembled slide 22 and bar 20 are moved inwardly of the base 12 until the lip portion 74 of the slide 22 snaps over the upstanding ears 70 and 72. The dimensional relationship of the lip portion 74 and the height of the ears 70 and 72 are such that resilience of the slide 22 accommodates the aforementioned snapping of the lip portion 74 over the ears 70 and 72. After the slide 22 is moved to the assembled condition, as shown in FIG. 5 of the drawings, the edge or lip portion 74 precludes disassembly of the slide 22 on the base 12.

It is to be noted that couples acting on the safety belt buckle 10 are minimized, since load is transmited to the tongue 30 from the end portion 38 of the belt 36, thence from the latch surface 92 on the aperture 93 in the tongue 30 to the latch face 90 on the latch plate 14. The load is then transmitted substantially in a straight line generally parallel to the tongue 30 to the edge portion 52 of the latch plate 14, thence to the reentrantly folded edge portion 50 on the web 40 of the base 12. Load is then transmitted through the web 40 of the base 12 and flange portions 42 and 44 of the base 12 to the opposite end portion 142 thereof, thence to the end portion 34 of the belt 36.

It is to be noted that the release handle 18 of the buckle 10 is of relatively light gauge material and relatively short in length. Thus, it is not cumbersome and is relatively easily operated.

As best seen in FIG. 4 of the drawings, the belt buckle 10 of the instant invention comprises only seven components, including the tongue 30, each of which is made by a stamping or coining process.

In accordance with yet another feature of the instant invention, the latch plate 14 is biased toward a latching condition relative to the latch surface 92 of the tongue 30 upon the application of load to the buckle 10. The relatively small moment acting on the latch plate 14 tends to rotate the latch plate clockwise, as seen in FIG. 6 of the drawings, thereby relieving the operating spring 16 of its function of holding the latch plate 14 in the engaged condition with the tongue 30 when the buckle 10 is subjected to load.

As discussed hereinbefore, the latch plate 14, handle 18, bar 20 and slide 22 are retained on the base portion 12 of the buckle 10 by mutually interlocking engagement. Thus, the use of retaining pins, screws, or other elements having the single function of retaining the components of the buckle 10 in an assembled condition [are] *is* eliminated.

From the foregoing description, it should be apparent that the base member 12 forms the basic load-carrying and supporting component of the buckle 10 and that the base 12 comprises a flanged channel of relatively large strength-to-weight ratio. Thus, the properties of the flange channel are utilized to maximize the strength of the buckle 10, while minimizing the size and weight thereof.

As best seen in FIG. 7 of the drawings, the release handle 18 of the buckle 10 is movable counterclockwise or in a direction opposite to the direction of movement of the tongue 30 upon movement of the release handle 18 to the release condition. Thus, an occupant of the motor vehicle is merely required to pull on the handle 18 to effect separation of the tongue 30 from the base portion 12 and handle 18 of the buckle. This is an important feature not found in many commercially available seat belt buckles.

As best seen in FIG. 7 of the drawings, the edge portion 117 of the release handle 18 is at a distance which is relatively close to the pivot point of the offset portion 110 on the underside of the edges 46 and 48 of the base portion 12 relative to the total length of the handle 18. Thus, the handle 18 operates as a lever having a relatively large mechanical advantage so that the end portion 118 of the latch plate 14 can be biased downwardly against the frictional force acting between the latch face 90 and the latch surface 92 so that the tongue 30 can be freed from the base portion 12 by a relatively light force, even though the buckle 10 is subjected to a substantial load.

As can be seen by comparing FIGS. 5 and 6, insertion of the tongue 30 into the base portion 12 of the buckle does not require movement of the release handle 18. As the tongue 30 moves into the base 12, it is guided by the edge portions 46 and 48 of the base 12 and the strippers 60 and 62 so as to bias the latch plate 14 downwardly, allowing the latch face 90 thereon to clear the tongue 30, thence move upwardly into the latching condition with the latch surface 92 on the tongue 30 under the bias of the operating spring 16 when the tongue 30 is fully inserted into the base portion 12. Thus, the safety belt buckle 10 can be easily grasped in one hand, facilitating insertion of the tongue 30 with the other hand.

It is to be noted that the frontal edge portion of the handle 18 is reentrantly folded to form a guide that directs the tongue 30 into the proper aligned position under the edge portions 46 and 48 of the base 12. Also, the reentrantly folded latch retainer 50 on the web 40 of the base 12 tends to guide the tongue 30 into proper alignment for insertion. The foregoing reentrantly folded surfaces thus form an obvious opening in the buckle 10 for the acceptance of the tongue 30. Further, should the tongue 30 be inserted under the release handle 18, but on top of the edges 46 and 48 of the base 12, spurious latching is precluded, since the latch face 90 on the latch plate 14 cannot effect latching with the surface 92 on the tongue 30.

As discussed hereinbefore, it is desirable that high inertia or "G" forces operative on the latch plate of a buckle do not tend to spuriously open the buckle and effect release of the tongue thereof. As can be seen by inspection of, for example, FIG. 6, the tongue 30 is disposed over the latch plate 14. Thus, "G" forces having an upward vector operable on the latch plate 14 due to, for example, impact of an automobile with an object, tend to move the latch plate 14 upwardly, thus tending to retain the latch plate 14 and latch face 90 thereof in engagement with the complementary latch surface 92 on the tongue 30.

As can be seen by inspecting FIG. 9 of the drawings, lengthening of the belt 36 requires both movement of the slide 22 inwardly of the base 12 and tilting of the buckle 10 relative to the end portion 34 of the belt 36. When the belt buckle 10 is so tilted and the slide 22 is moved inwardly as by a longitudinal squeeze, lengthening of the belt 36 can be effected with one hand by merely pulling on the buckle 10. It is also to be noted that by gripping the buckle 10 at opposite ends thereof in order to lengthen the belt 36, the slide 22 is moved to the release position.

Shortening of the belt 36 is effected by merely pulling on the top or free end portion 34 of the belt 36, which action tends to rotate the locking bar 20 upwardly to the position shown in FIG. 8, so that the upper surfaces of the flattened end portions 134 and 136 engage the upper edge portions of the apertures 130 and 132 in the slide ears 120 and 122, respectively. When in this position the angular relationship of the belt bar 20 is such that the belt moves freely over the bar 20 to permit shortening of the belt 36. It is to be noted that the shortening operation does not require movement of the slide 22 to the release condition required to effect lengthening of the belt 36. This mode of operation again reflects an awareness of the actual condition that obtains in a motor vehicle, since it is normal for an occupant to assemble the tongue 30 with the belt buckle 10 or base portion 12 of the buckle 10, thence effect shortening of the belt to a desired length comfortable to the motorist. Shortening of the belt 36 can thus be effected by only one hand working against the opposite end of the belt.

The bar 20 is substantially free of knurled, abraded or otherwise roughened surfaces, which tend to accelerate wear of the belt 36. The novel configuration and orientation of the bar 20, in combination with its disposition in spaced relation to the web portion 40 of the base 12, and overlying the portion 142 of the base 12, all are mutually complementary to facilitate holding of the belt 36 under load without requiring such knurled or roughened surfaces.

As can best be seen from FIGS. 1, 2 and 3, the belt buckle 10 of the instant invention is relatively clean and entirely free of protruding surfaces or components. Thus, the buckle 10 does not tend to catch clothing or otherwise present sharp surfaces that might limit use of the buckle 10.

From the foregoing description, it should be apparent that the safety belt buckle 10 of the instant invention can be fabricated from sheet metal having the same analysis. Therefore, electrolysis between adjacent components is precluded, obviating a defect experienced in safety belt buckles heretofore known and used when such buckles were exposed to, for example, salt spray or the like.

As discussed hereinbefore, lengthening of the seat belt requires both tipping of the buckle 10 and inward movement of the slide 22 thereof to carry the belt bar 20 to a position inwardly of the buckle 10. This orientation of the belt bar 20 relative to the width of the slot 80 in the web portion 40 of the base 12 precludes spurious release of the end portion 34 of the belt 36 due to accidental tipping of the buckle 10.

Yet another feature of the buckle 10 of the instant invention is that the belt bar 20 is of substantially flat cross-sectional configuration, thereby to allow a relatively low and clean profile for the buckle 10, which adds to its aesthetic appeal, as well as minimizing the overall size and weight thereof.

It is to be understood that the specific construction of the improved safety belt buckle herein disclosed and described is presented for the purpose of explanation and illustration and is not intended to indicate limits of the invention, the scope of which is defined by the following claims.

What is claimed is:

1. A safety belt buckle comprising
a base member
having
a web portion
with
upstanding flanges
on opposite sides with
inturned edge portions
extending in spaced generally parallel relationship to the web portion thereof, said base member having
a latch plate retainer
at one end thereof,
a latch plate
overlying the web portion of said base member in generally parallel relationship and having
one end
pivoted in the latch retainer of said base, said latch plate having
a latch face
thereon,
a belt tongue
having
a latch surface thereon and being insertable under the edge portions of said base member in overlying generally parallel relation to said latch plate, the latch face on said latch plate being engageable with the latch surface on said tongue to lock said tongue against movement outwardly of said base,
resilient means
normally biasing said latch plate toward said tongue, and
a release handle having a pair of oppositely laterally extending ears at one end thereof underlying the edge portions of said base member so as to be
pivotally supported by said base member adjacent the other end of said latch plate, said handle overlying said tongue, said handle being directly engageable with the other end of said latch plate whereby rotation of said release handle relative to said base effects disengagement of the latch face on said latch plate from the latch surface on said tongue.

2. A safety belt buckle comprising
a base member
having
a web portion
with
upstanding flanges
on opposite sides with
inturned edge portions
extending in spaced generally parallel relationship to the web portion thereof, said base member having
a latch plate retainer
at one end thereof and
a pair of tongue strippers
extending into closely spaced relation to the edge portions thereof, respectively,
a latch plate
overlying the web portion of said base member in generally parallel relationship and having
one end
pivoted in the latch retainer of said base and a pair of apertures for the acceptance of the tongue strippers on said base, respectively, said latch plate having
a laterally offset latch face
on the opposite side thereof from the web portion of said base,
a belt tongue
having
an aperture
defining
a latch surface, said belt tongue being
insertable under the edge portions of said base member in overlying generally parallel relation to said latch plate, the latch face on said latch plate being engageable with the latch surface on said tongue to lock said tongue against movement outwardly of said base,
resilient means
between the web portion of said base and said latch plate for normally biasing said latch plate toward said tongue, and
a release handle
having an intermediate portion pivotally engaged with the edge portions of said base member adjacent the other end of said latch plate and overlying said tongue, one end portion of said handle engaging the other end of said latch plate whereby movement of the other end portion of said release handle in one direction relative to said base effects disengagement of the latch face on said latch plate from the latch surface on said tongue and conditions said tongue for movement in the opposite direction relative to said base.

3. A safety belt buckle comprising
a sheet metal base member
having
a web portion
with
upwardly folded flanges
on opposite sides with
inwardly folded edge portions
extending in spaced generally parallel relationship to the web portion thereof, said base member having
a latch plate retainer
reentrantly folded at one end thereof,
a sheet metal latch plate
overlying the web portion of said base member in generally parallel relationship and having
one end
pivoted in the latch retainer of said base, said latch plate having
a laterally extending latch face
thereon,
a sheet metal belt tongue
having
a laterally extending latch surface thereon, said tongue being insertable under the edge portions of said base member in overlying generally parallel relation to said latch plate, the latch face on said latch plate being engageable with the latch surface on said tongue to lock said tongue against movement outwardly of said base,
a leaf spring
disposed between the web portion of said base and said latch plate and normally biasing said latch plate toward said tongue, and
a sheet metal release handle having a pair of ears on opposite sides thereof engaged under the edge portions of said base whereby said handle is
pivotally supported by said base member adajcent the other end of said latch plate, said handle overlying said tongue, said handle engaging the other end of said latch plate so that rotation of said release handle relative to said base effects rotation of said latch plate and disengagement of the latch face on said latch plate from the latch surface on said tongue.

4. A safety belt buckle comprising
a base member
having
a web portion
with
upstanding flanges
on opposite sides with
inturned edge portions
extending in spaced generally parallel relationship to the web portion thereof, said base member having
a latch plate retainer
at one end thereof,
a latch plate
overlying the web portion of said base member in generally parallel relationship and having
one end
pivoted in the latch retainer of said base, said latch plate having
a laterally offset latch face
on the opposite side thereof from the web portion of said base,
a belt tongue
having
an aperture
defining
a latch surface, said belt tongue being
insertable under the edge portions of said base member in overlying generally parallel relation to said latch plate, the latch face on said latch plate being engageable with the latch surface on said tongue to lock said tongue against movement outwardly of said base,
resilient means
between the web portion of said base and said latch plate for normally biasing said latch plate toward said tongue, and a release handle extending generally parallel to said belt tongue and having an intermediate portion pivotally engaged under and interlocked with the edge portions of said base member adjacent the other end of said latch plate, one end portion of said handle relatively close to the intermediate portion thereof engaging the other end of said latch plate and the other end portion of said release handle being spaced relatively farther from the pivoted intermediate portion so as to provide a mechanical advantage to facilitate movement of the latch face on said latch plate laterally of said tongue upon rotation of said handle.

5. A safety belt buckle comprising a base member having a web with upstanding flanges on opposite sides thereof with inturned edge portions extending in spaced generally parallel relationship to the web portion thereof, said base member having means at one end thereof for retaining a latch plate and means at another end for retaining a release handle, a latch plate having a latch thereon, said latch plate being disposed between the web portion and edge portions of said base, resilient means between the web portion of said base and said latch plate for normally biasing said latch plate away from the web portion of said base, a release handle having a pair of oppositely laterally extending ears engaged under and retained by the edge portions of said base member whereby said release handle is pivotally supported by the edge portions of said base member, said handle being engageable with said latch plate to effect movement thereof against the bias of said spring, and a belt tongue having a latch surface engageable with the latch on said latch plate, said belt tongue being insertable between said latch plate and handle, insertion of said tongue effecting movement of said latch plate towards the web portion of said base against the bias of said spring whereby said belt tongue can be assembled with said base member without effecting movement of said handle.

6. A safety belt buckle for a motor vehicle comprising a base member having a web portion with upstanding flanges on opposite sides thereof, said flanges having inturned edge portions extending in spaced generally parallel relationship to the web portion of said base for pivotally supporting a release handle, said base member having a latch plate retainer at one end thereof, a latch plate overlying the web portion of said base member in generally parallel relationship, said latch plate having one end pivoted in the latch retainer of said base and having a laterally extending latch face thereon, a belt tongue having a laterally extending latch surface thereon and insertable under the supporting means on said base member in overlying generally parallel relation to said latch plate, the latch face on said latch plate being engageable with the latch surface on said tongue to lock said tongue against movement outwardly of said base, a leaf spring disposed between the web portion of said base and said latch plate and normally biasing said latch plate toward said tongue, and a release handle having an intermediate portion pivotally supported by the means on said base member and one end portion engaged with the other end of said latch plate whereby inertia forces operative on said latch plate attendant to sudden stoppage of a motor vehicle tend to bias both said latch plate and said handle to the latched condition.

7. A safety belt buckle comprising a base member having a web portion with upstanding flanges on opposite sides thereof with inturned edge portions extending in spaced generally parallel relationship to the web portion thereof, said base member having means at one end thereof for retaining a latch plate against movement in one direction and means at an intermediate portion thereof for retaining said latch plate and a release handle against movement in the opposite direction, a latch plate having a latch thereon, said latch plate overlying the web portion of said base member and having means for restraining the release handle against movement in said one direction, a belt tongue having a latch surface engageable with the latch on said latch plate, resilient means between the web portion of said base and said latch plate for normally biasing said latch plate toward said tongue, and a release handle pivotally supported by said base member at the intermediate portion thereof, said handle being engageable with said latch plate to effect disengagement of the latch thereon from the latch surface on said tongue, the edge portions of said base retaining said release handle, tongue, latch plate and resilient means against movement in a direction normal to said one direction whereby said base, latch plate, resilient means and release handle of said buckle are mutually interlocked in an assembled condition.

8. A safety belt buckle comprising
a base member
having
means
at one end thereof for retaining a latch plate against movement in one direction, said base member having means for limiting movement of a belt tongue in a direction normal to said one direction, said base member having
means
at an intermediate portion for retaining a release handle and the latch plate against movement in the opposite direction,
a latch plate
engaged with the one end portion of said base and having
means
for restraining a release handle against movement in said one direction,
a belt tongue
engageable with said latch plate,
resilient means
for normally biasing said latch plate in said normal direction toward the engaged condition with said tongue, movement of said latch plate and said tongue being limited by said limiting means,
a release handle
pivotally supported by said base member at the intermediate portion thereof, said handle being engageable with said latch plate to effect disengagement thereof from said tongue, means for separating said latch plate and belt tongue upon movement of said latch plate in a direction opposite to said normal direction, and
a slide
at the other end of said base having
means
for engaging a belt, said slide having
means
engageable with said base for restraining movement thereof in said opposite direction.

9. A safety belt buckle comprising a base member having a web portion with upstanding flanges on opposite sides, said flanges having inturned edge portions extending in spaced generally parallel relationship to the web portion thereof, said base member having a latch member retainer adjacent one end thereof, a latch member overlying the web portion of said base member in generally parallel relationship and having one end pivoted in the latch retainer of said base, said latch member having a latch face thereon, a belt tongue having a latch surface thereon, said belt tongue being insertable in said base member between said flanges and in generally parallel relation to said latch member, the latch face on said latch member being engageable with the latch surface on said tongue to lock said tongue against movement endwise outwardly of said base, resilient means normally biasing said latch member toward said tongue, means including said inturned edge portions for limiting movement of said latch and tongue away from said web, and a release handle having a pair of oppositely laterally extending projections at one end thereof underlying the edge portions of said base member so as to fulcrum on the underside of said edge portions, said handle having a portion operative to disengage the latch face on said latch member from the latch surface on said tongue when the handle is rotated about said fulcrum.

10. A safety belt buckle comprising a sheet metal base member having a web portion with upwardly folded flanges on opposite sides, said flanges having inwardly folded edge portions extending in spaced generally parallel relationship to the web portion thereof, said base member having a latch plate retainer reentrantly folded at one end thereof, a sheet metal latch plate overlying the web portion of said base member in generally parallel relationship and having one end fulcrumed in the latch retainer of said base, said latch plate having a laterally extending latch face thereon, a sheet metal belt tongue having a laterally extending latch surface thereon, said tongue being insertable endwise under the edge portions of said base member and on the opposite side of said latch plate from said base, the latch face on said latch plate being engageable with the latch surface on said tongue to lock said tongue against movement endwise outwardly of said base, a sheet metal spring having at least a portion thereof disposed between the web portion of said base and said latch plate and normally biasing said latch plate toward said tongue, and a sheet metal release handle having a pair of projections on opposite sides thereof engaged under the edge portions of said base whereby said handle is fulcrumed by said projections on the underside of said edge portions adjacent the other end of said latch plate, said handle overlying said tongue, and means including a portion of said handle which engages the latch plate for releasing the latch face thereon from the latch surface on said tongue when the handle is rotated about its fulcrum point.

11. A safety belt buckle comprising a base member having a web portion with upstanding flanges on opposite sides, said flanges having inturned edge portions extending in spaced generally parallel relationship to the web portion thereof, said base member having a latch member retainer adjacent one end thereof, a latch member overlying the web portion of said base member in generally parallel relationship and having one end pivoted in the latch retainer of said base, said latch member having a latch face thereon, a belt tongue having a latch surface thereon, said belt tongue being insertable in said base member between said flanges and in generally parallel relation to said latch member, the latch face on said latch member being engageable with the latch surface on said tongue to lock said tongue against movement endwise outwardly of said base, resilient means normally biasing said latch member toward said tongue, and a release handle having a pair of oppositely laterally extending projections at one end thereof underlying the edge portions of said base member so as to fulcrum on the underside of said edge portions, said handle having a portion operative to disengage the latch face on said latch member from the latch surface on said tongue when the handle is rotated about said fulcrum.

12. A safety belt buckle comprising a base member having a web portion with upstanding flanges on opposite longitudinally extending sides thereof, said flanges having inturned edge portions extending in spaced generally parallel relationship to the web portion of said base member, said base member having a longitudinally spaced means thereon for retaining a latching means against movement in either direction longitudinally of said base, a latching means including a latch member having a latch face thereon and a spring, means including the edge portions of said base member for restraining movement of said latching means away from the web portion of said base member, a belt tongue having a latch surface engageable with the latch face on said latch member, said spring normally biasing said latch member toward said tongue, a release handle having oppositely laterally extending projections thereon extending under the edge portions of said base member so as to be pivotally supported by said base member, said handle being engageable with said latch member to effect disengagement of the latch face thereon from the latch suface on said tongue, means on said latching means for restraining movement of said handle in one direction longitudinally of said base, and means supported by said base for restraining longitudinal movement of said handle in the direction opposite to said one direction whereby said base, latch means and release handle are mutually interlocked in an assembled condition.

*13. A buckle for a safety belt having two sections, comprising male and female portions, said female portion including a body with a back and two sides joined to said back and with openings adjacent the ends, a lever in one end of said body and having a forwardly projecting boss thereon with a shoulder on its inner edge, a spring means between said back and said lever urging said lever forwardly, a front cover for said body pivoted at the sides thereof near the inner end of said lever and having a means for engaging the inner end of said lever to press said lever rearwardly against the force of said spring means, a means in said body in the end opposite said lever for receiving a section of said web, and means on said female portion for holding said male portion against forward movement relative to said lever, and said male portion including a slot with a forward edge for slipping over said boss and engaging said shoulder and having a means for receiving one end of said other belt section.*

*14. A safety belt buckle comprising a base member having a web portion with upstanding flanges on opposite sides, said flanges having inturned edge portions extending in spaced generally parallel relationship to the web portion thereof, said base member having a latch member retainer adjacent one end thereof, a latch member overlying the web portion of said base member in generally parallel relationship and having one end pivoted in the latch retainer of said base, said latch member having a latch face thereon, a belt tongue having a latch surface thereon and being insertable in said base member under the edge portion on said flanges and in engagement therewith in generally parallel relation to said latch member, the latch face on said latch member being engageable with the latch surface on said tongue to lock said tongue against movement endwise outwardly of said base, resilient means normally biasing said latch member toward said tongue, and a pivotable release member fulcrumed for rotation about an axis spaced from and generally parallel to the axis of rotation of said latch member and engageable with said latch member to disengage the latch face thereon from the latch surface on said tongue.*

*15. A safety belt buckle in accordance with claim 14 including means for disengaging said tongue from said latch member comprising a cantilevered member one end of which is supported against movement by the web portion of said base, the free end of said cantilevered member being engageable with said tongue to restrain movement thereof toward the web portion of said base upon movement of said latch member.*

*16. A safety belt buckle comprising a base member having a web portion with upstanding flanges on opposite sides, said flanges having inturned edge portions extending in spaced generally parallel relationship to the web portion thereof, said base member having a latch member retainer adjacent one end thereof, a latch member overlying the web portion of said base member in generally parallel relationship and having one end pivoted in the latch retainer of said base, said latch member having a latch face thereon, a belt tongue having a latch surface thereon, said belt tongue being insertable in said base member between the web and edge portions thereof in generally parallel relation to said latch member, the latch face on said latch member being engageable with the latch surface on said tongue to lock said tongue against movement endwise outwardly of said base, resilient means normally biasing said latch member toward said tongue, means including said inturned edge portions for engaging said tongue and for limiting movement of said tongue away from the web portion of said base, cantilevered means for limiting movement of said tongue toward the web portion of said base, said cantilevered means having one end portion supported by the web portion of said base and a free end portion engageable with said tongue, and release means engageable with said latch member and operable to disengage the latch face thereon from the latch surface on said tongue.*

*17. A safety belt buckle comprising a base member having a web portion with upstanding flanges on opposite sides, said flanges having inturned edge portions extending in spaced generally parallel relationship to the web portion thereof, said base member having a latch member retainer adjacent one end thereof, a latch member overlying the web portion of said base member in generally parallel relationship and having one end pivoted in the latch retainer of said base, said latch member having a latch face thereon, a belt tongue having a latch surface thereon, said belt tongue being insertable in said base member between said flanges and under and engaging said inturned edge portions and in generally parallel relation thereto and to said latch member, the latch face on said latch member being engageable with the latch surface on said tongue to lock said tongue against movement endwise outwardly of said base, resilient means normally biasing said latch member toward said tongue, and a pivotable release member fulcrumed for rotation about an axis extending generally parallel to the axis of rotation of said latch member and operative to disengage the latch face on said latch member from the latch surface on said tongue.*

*18. A safety belt buckle comprising a base member having a web portion with upstanding flanges an opposite longitudinally extending sides thereof, said flanges having inturned edge portions extending in spaced generally parallel relationship to the web portion of said base member, said base member having means thereon for retaining a latching means against movement in one direction longitudinally of said base, a latching means including a latch member having a latch face thereon and a spring, said spring having a reentrantly folded end portion engageable about a portion of said latch member to preclude movement of said spring in a direction opposite to said one direction, and a belt tongue insertable under and engaging said inturned edge portions and having a latch surface engageable with the latch face on said latch member, said spring normally biasing said latch member toward said tongue.*

*19. A buckle for a safety belt having two sections, comprising male and female portions, said female portion including a body with a back and two sides joined to said back and inturned edge portions on said sides extending in spaced generally parallel relationship to said back, a lever in one end of said body, a spring means between said back and said lever urging said lever forwardly, a means for operating said lever, a means in said body in the end opposite said lever for receiving one end of one belt section, means comprising said inturned edge portion for holding said male portion against forward movement relative to said lever, said lever and male portion having an interlocking lug and slot for holding said lever and male portion in locked position, means for disengaging said lever and male portion when said lever is operated to unlatch said buckle, and means on said male portion for receiving one end of said other belt section.*

(References on following page)

References Cited

The following references, cited by the Examiner, are of record in the patented file of this patent or the original patent.

UNITED STATES PATENTS

| | | |
|---|---|---|
| 401,880 | 4/1889 | Frantzen. |
| 1,607,085 | 11/1926 | Kilstrom. |
| 1,764,240 | 6/1930 | Blustein |
| 2,143,126 | 1/1939 | Honegger. |
| 2,862,268 | 12/1958 | Cushman. |
| 2,864,145 | 12/1958 | Elsner. |
| 2,919,481 | 1/1960 | Finken et al. |

| | | | |
|---|---|---|---|
| 2,999,288 | 9/1961 | Warner et al. | |
| 3,181,215 | 5/1965 | Eberhart | 24—75 |

FOREIGN PATENTS

| | | |
|---|---|---|
| 1,204,470 | 1/1960 | France. |
| 818,988 | 8/1959 | Great Britain. |
| 196,035 | 3/1908 | Germany. |
| 670,672 | 8/1929 | France. |
| 1,072,643 | 3/1954 | France. |
| 464,786 | 8/1928 | Germany. |
| 81,813 | 7/1919 | Switzerland. |

BERNARD A. GELAK, Primary Examiner